US007551167B2

(12) United States Patent
Park et al.

(10) Patent No.: US 7,551,167 B2
(45) Date of Patent: Jun. 23, 2009

(54) SHIFT REGISTER AND DRIVING CIRCUIT OF LCD USING THE SAME

(75) Inventors: Jin-Ho Park, Kyongki-do (KR); Dong-Won Park, Kyongki-do (KR); Oh-Jong Kwon, Kyongki-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 816 days.

(21) Appl. No.: 11/124,099

(22) Filed: May 9, 2005

(65) Prior Publication Data

US 2005/0207200 A1 Sep. 22, 2005

Related U.S. Application Data

(62) Division of application No. 09/886,029, filed on Jun. 22, 2001, now abandoned.

(30) Foreign Application Priority Data

Jul. 18, 2002 (KR) .............................. 2000-40942

(51) Int. Cl.
*G06F 3/038* (2006.01)
*G09G 5/00* (2006.01)

(52) U.S. Cl. ...................................................... 345/204

(58) Field of Classification Search .......... 345/204–215
See application file for complete search history.

(56) References Cited

U.S. PATENT DOCUMENTS

| | | | | | |
|---|---|---|---|---|---|
| 3,708,690 | A * | 1/1973 | Paivinen | ...................... | 377/54 |
| 4,491,930 | A * | 1/1985 | Hyatt | ............................ | 708/3 |
| 5,245,326 | A * | 9/1993 | Zalph | .......................... | 345/92 |
| 5,566,103 | A * | 10/1996 | Hyatt | .......................... | 365/45 |
| 6,724,363 | B1 * | 4/2004 | Satoh et al. | ................. | 345/100 |
| 7,190,342 | B2 * | 3/2007 | Matsuda et al. | ............. | 345/100 |
| 7,420,402 | B2 * | 9/2008 | Washio et al. | ............... | 327/208 |

* cited by examiner

*Primary Examiner*—Srilakshmi K Kumar
(74) *Attorney, Agent, or Firm*—Haynes and Boone, LLP

(57) ABSTRACT

A shift register is provided, which adopts a shift operation delay for each memory device, or a data conversion control system through the estimation of conversion of data storage state. A driver circuit of LCD is provided, which adopts such a shift register, to thereby prevent instantaneous increase of electric power consumption while preventing EMI.

Accordingly, shift registers operate as being sequentially delayed for each memory device or data conversion is minimized, thus preventing instantaneous excessive consumption of electric power.

11 Claims, 5 Drawing Sheets

SHIFT REGISTER AND DRIVING CIRCUIT OF LCD USING THE SAME

CROSS REFERENCE TO RELATED APPLICATIONS

This application is a divisional of U.S. patent application Ser. No. 09/886,029, filed Jun. 22, 2001 now abandoned, the disclosure of which is expressly incorporated herein by reference.

BACKGROUND OF THE INVENTION

1. Field of the Invention

The present invention in general relates to a shift register and a driver circuit of liquid crystal display adopting the shift register, and more particularly, to a shift register that adopts a shift delay for each memory device, or a data conversion control system through the estimation of conversion of data storage state. The present invention further relates to a driver circuit of LCD adopting such a shift register, which can prevent instantaneous increase of electric power consumption as well as EMI (electromagnetic interference) occurrence.

2. Description of the Related Art

A shift register is a logic circuit having memory devices such as flip flop or latch arranged in line so as to sequentially shift input data between memory devices and stores predetermined amount of data.

Typically, shift registers have been widely used in a digital circuitry for processing digital data in a variety of fields. Specifically, shift registers are employed for timing controllers and driver ICs to drive an LCD that has been widely used as a flat panel display device. In such a case, a shift register is used for generating a control signal or delaying data for a predetermined time period.

A conventional shift register is configured such that data stored in the entire register can be simultaneously shifted in a direction at a rising time of clock, and data input/output is determined in accordance with a first-in first-out principle.

In detail, as for the shift register for processing 4-bit data, data D0, D1, D2, D3 are shifted for each of memory devices sequentially from the data input initially and move in a direction, and such data shift is synchronized with a clock. In addition, outputs D0, D1, D2 and D3 are output in the same order as they are input.

To perform such an operation, a large amount of current is required to be supplied to a logic circuit instantaneously for driving a shift register since the shift register is synchronized with clocks during such an operation and each of memory devices operates at the same time. This consumes a large amount of power instantaneously while producing EMI.

This phenomenon is fortified when the data stored in the shift register change the state significantly. More specifically, a large amount of electric power is required when a memory device changes logic 0 or logic 1 so as to perform shift operation synchronized with a clock signal. The increased number of shift registers requiring the state change requires low power consumption and decreased EMI.

SUMMARY OF THE INVENTION

Therefore, it is an object of the present invention to reduce instantaneous power fluctuation caused during an operation of shift register and EMI by adjusting the timing of operation of each of memory devices arranged in line in the shift register.

It is another object of the present invention to check in advance the shift state of data being applied to a shift register that is configured as a matrix so as to process predetermined bits of data, and reduce cases of operation of shift register, to thereby reduce power consumption and EMI caused by a large number of shift registers operating at the same time.

It is still another object of the present invention to improve configuration of a shift register which constitutes components for driving a flat panel display in such a manner that a plurality of shift registers are prevented from being operated at the same time, to thereby reduce power consumption and EMI.

To accomplish the above objects of the present invention, there is provided a shift register including memory devices formed of an m-row×n-column matrix and shifting data synchronized with a clock signal; a clock signal delay unit for gradually delaying the clock signal applied to the memory devices starting from an m-row memory device that outputs data toward rows of memory device to which data is being input; and a data delay unit for delaying the data to have delay time identical with the delay time of a clock signal applied to an input side memory device and outputting the result. Preferably, the clock signal delay unit has delay portions that delay the clock signal. The delay portions are one-to-one matched to m-1 row, m-2 row, . . . 1 row memory devices. It is preferable that the delay portions output the clock signal with delay time increased in the order of m-1 row, m-2 row, . . . 1 row.

To accomplish the above object of the present invention, there is provided a shift register including memory devices formed of an m-row×n-column matrix and shifting data synchronized with a clock signal; a first switching unit for selectively inverting n-bit data in accordance with a first switching control signal and inputting the inverted data to a first row memory device of each column that constitutes memory device; a second switching unit for selectively inverting n-bit data shifted by memory devices and output to each column of m-row in accordance with a second switching control signal and outputting the inverted data; a shift comparing unit for outputting a flag signal while outputting a first switching control signal to the first switching unit upon occurrence of change to the data stored state of memory devices arranged in the first row, by utilizing n-bit data being input to the first switching unit and the output data of the first row included in the memory devices; and a shift comparing shift register having m-numbers of memory devices arranged in line and shifting the flag signal output from the shift comparing unit to be synchronized with the shift of the memory devices and outputting a second control signal to the second switching unit.

A driver circuit of LCD according to the present invention has each unit for generating data, gradation voltage, gate voltage and column/scan control signal for driving LCD by using an image signal applied from a predetermined image supply source, and a shift register is applied to each unit for processing data.

As a shift register constituting the above-described LCD, one of shift registers described above can be selected, and thus-selected shift register is adopted to one or more devices of a controller, or column or scan driver ICs.

BRIEF DESCRIPTION OF THE DRAWINGS

Additional features and advantages of the present invention will be made apparent from the following detailed description of a preferred embodiment, which proceeds with reference to the accompanying drawings, in which.

DETAILED DESCRIPTION OF THE INVENTION

The present invention will be explained in more detail with reference to the attached drawings.

Figure 1:
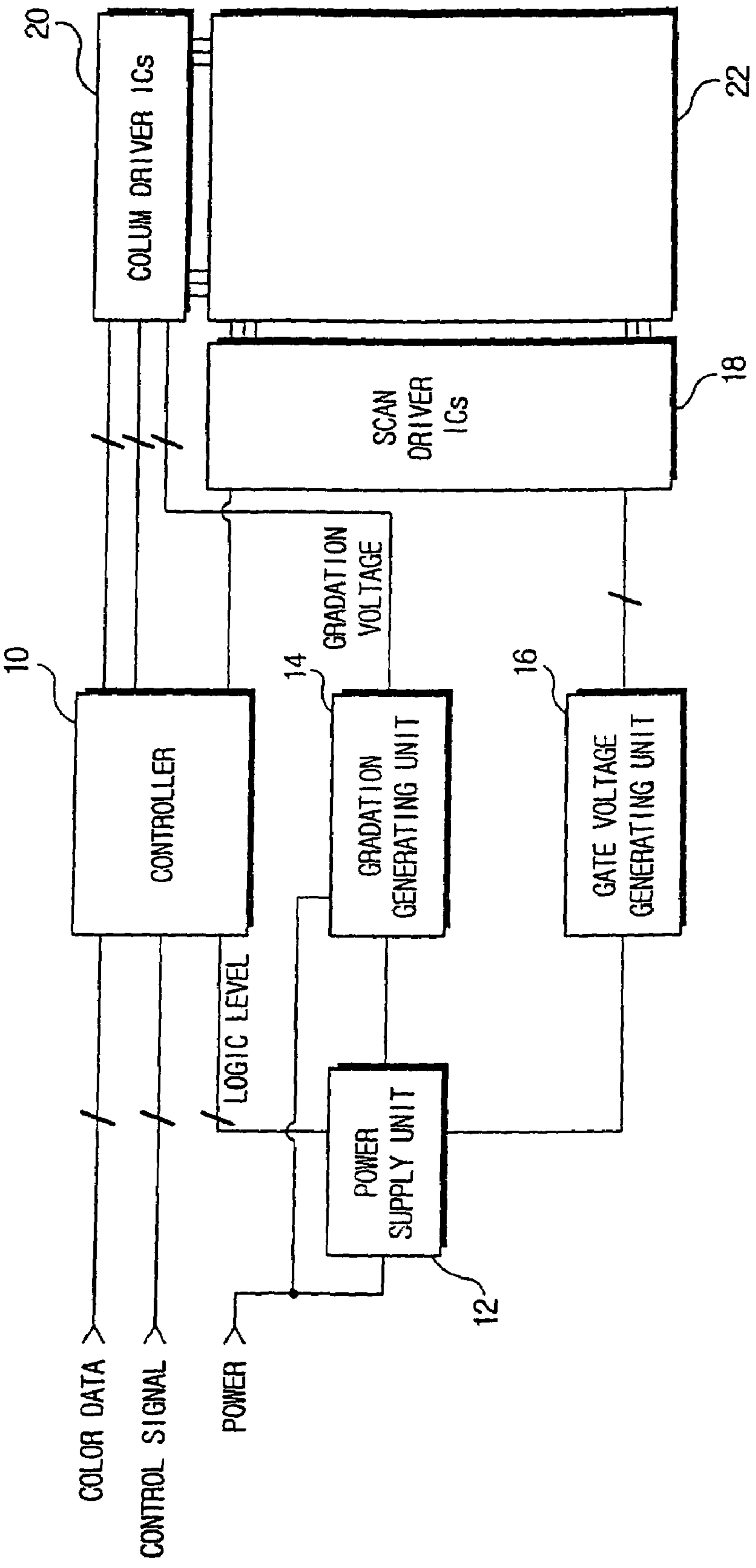
FIG. 1 is a block diagram illustrating an LCD and driver circuit according to the present invention.

Referring to FIG. 1, driving circuit of LCD includes a controller 10, column driver ICs 20 and scan driver ICs 18, each of which adopts a shift register.

The driver circuit of LCD is configured as follows.

A plurality of bits of color data and control signal are transmitted from a predetermined image supply source such as a main body of computer or an image transmitting device, and input to the controller 10.

A power supply unit 12 is arranged to supply constant voltages required for the operation of the controller 10, a gradation generating unit 14 and a gate voltage generating unit 16. The gate voltage generating unit 16 is arranged to supply voltages to scan driver ICs 18 so as to generate turn on/off voltages, and the gradation generating unit is arranged to supply gradation voltages to the column driver ICs 20.

The controller 10 generates control signals by using a shift register arranged therein with logic, and determines timing format while delaying data. As a result, column control signals and data output from the controller 10 are distributed to column driver ICs 20, and scan control signals are output as being distributed to scan driver ICs 18.

In addition, column driver ICs 20 generate a column signal by utilizing data, column control signals and gradation voltage, and applies the generated signal to a liquid crystal panel 22, while scan driver ICs 18 generate a scan control signal by utilizing a scan control signal and voltages applied from the gate voltage generating unit 16 and applies the generated signal to the liquid crystal panel 22. The liquid crystal panel 22 then performs an optical shutter function, while forming an image.

Figure 2:
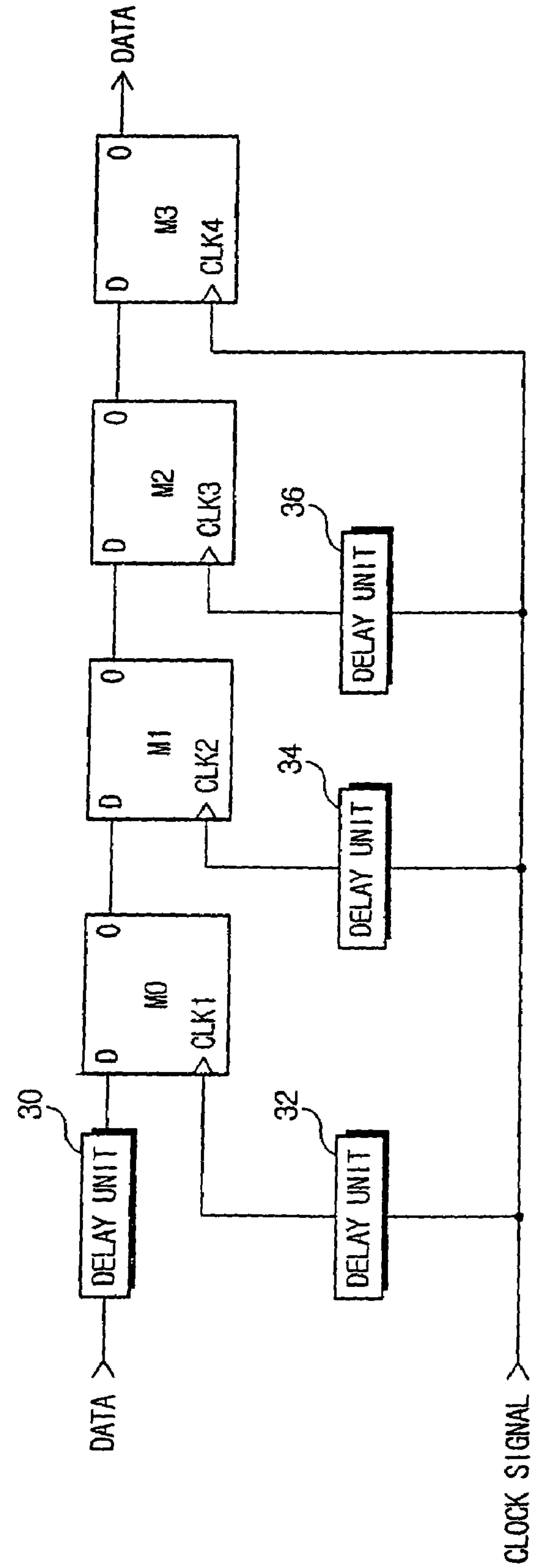
FIG. 2 is a block diagram illustrating a shift register according to an embodiment of the present invention.

In the above-described scheme, the controller 10, column driver ICs 20 and scan driver ICs 18 have shift registers incorporated therein. FIG. 2 illustrates a shift register adopted to such configuration. The shift register illustrated in FIG. 2 is for storing 4-bit data being input in serial, wherein D flip flop is employed as a memory device.

Referring to FIG. 2, D flip flops M0, M2, M2, M3 are connected in line in so as to transmit data according to the order of their arrangement. D flip flop M0 has an input terminal provided with a delay unit 30 connected thereto, and the other D flip flops M1, M2, M3 have clock signal input terminals CLK1, CLK2, CLK3 provided with delay units 32, 34, 36 respectively connected thereto.

Here, the delay unit 36 has delay time "t" set therein, the delay unit 34 has delay time "2t" set therein, and the other delay units 30, 32 have delay time "3t" set therein.

Accordingly, clock signals are input to D flip flop M3 through clock signal input terminal CLK4 without delay time, D flip flop M2 through clock signal input terminal CLK3 with delay time of "t", D flip flop M1 through clock signal input terminal CLK2 with delay time of "2t", and D flip flop M0 through clock signal input terminal CLK1 with delay time of "3t". The data is delayed for "3t" time by the delay unit 30 and input the input terminal of D flip flop M0.

As a result, D flip flop M3 is firstly synchronized with the clock signal and outputs data, then D flip flop M2 is synchronized with clock signal with delay time of "t" and outputs data which is stored in D flip flop M3.

D flip flop M2 which operates with time delay of "t" stores data of D flip flop M1 which is synchronized and output with time delay of "t" after operation of data output. D flip flop M1 which operates with time delay of "2t" stores data of D flip flop M0 which is synchronized and output with time delay of "t" after operation of data output. D flip flop M0 stores 1-bit data which is delayed by "3t" through the delay unit 30.

The above-described configuration of D flip flop that starts output side operation prior to the input side operation is to output data of D flip flop with stability and to store safely the data being shifted and input.

Figure 3:
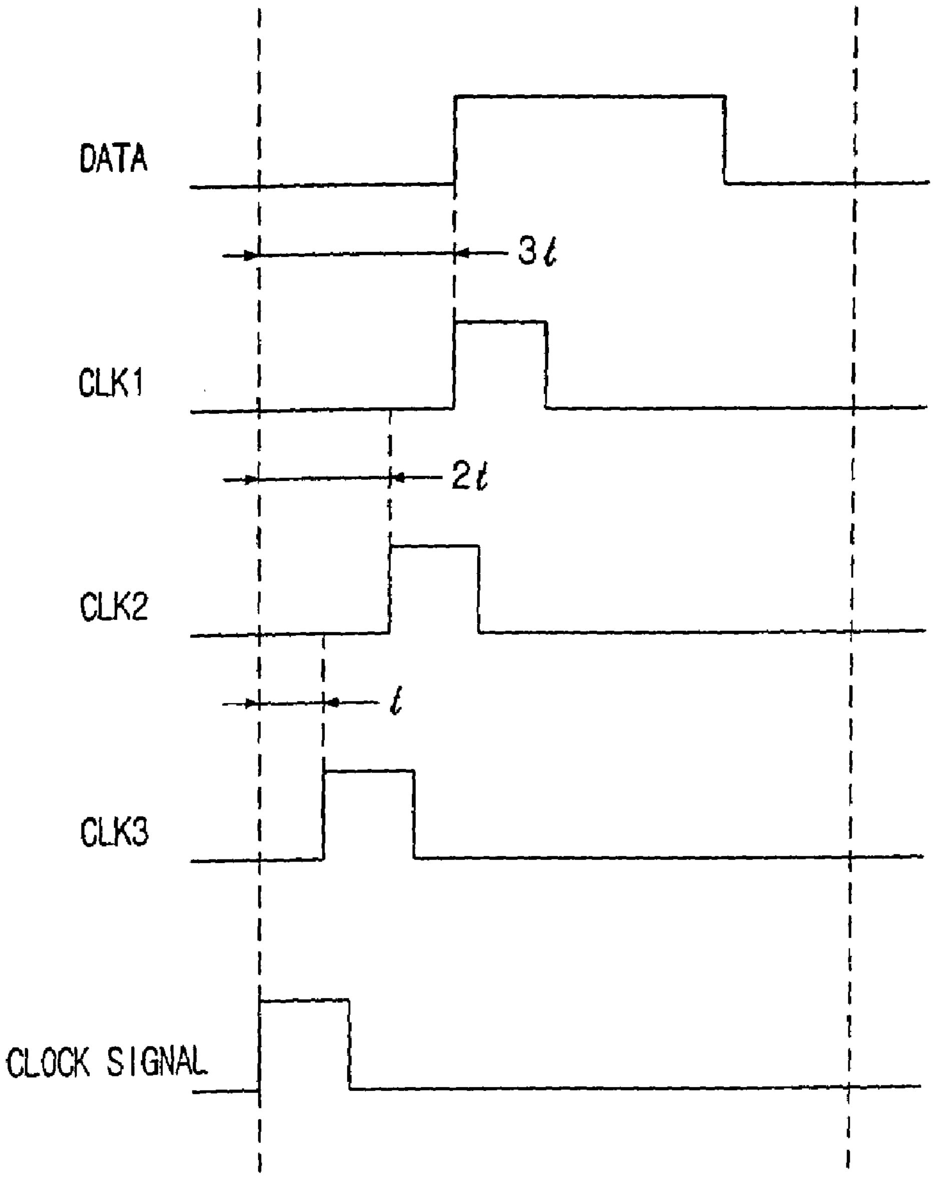
FIG. 3 is a timing chart illustrating the operation of the shift register shown in FIG. 2.

As shown in FIG. 3, clock signals for each of D flip flops are input to D flip flops M2, M1, M0, delayed as long as "t", "2t", "3t", respectively, when reference is made to the clock signal applied to D flip flop M3. The data applied to D flip flop M0 is delayed "3t" so as to correspond to the time of applying clock signal.

Accordingly, each of D flip flops, i.e., memory devices, operates with time difference arranged therebetween, and have different timings of power requirement for operation. This configuration does not require a large amount of current at the same time.

As a consequence, instantaneous power consumption can be reduced, while at the same time reducing EMI caused by the supply of instantaneous large amount of current.

The above-described configuration of shift register employing delay units illustrated and explained with reference to FIGS. 2 and 3, can be also applied to m×n matrix configuration.

Figure 4:
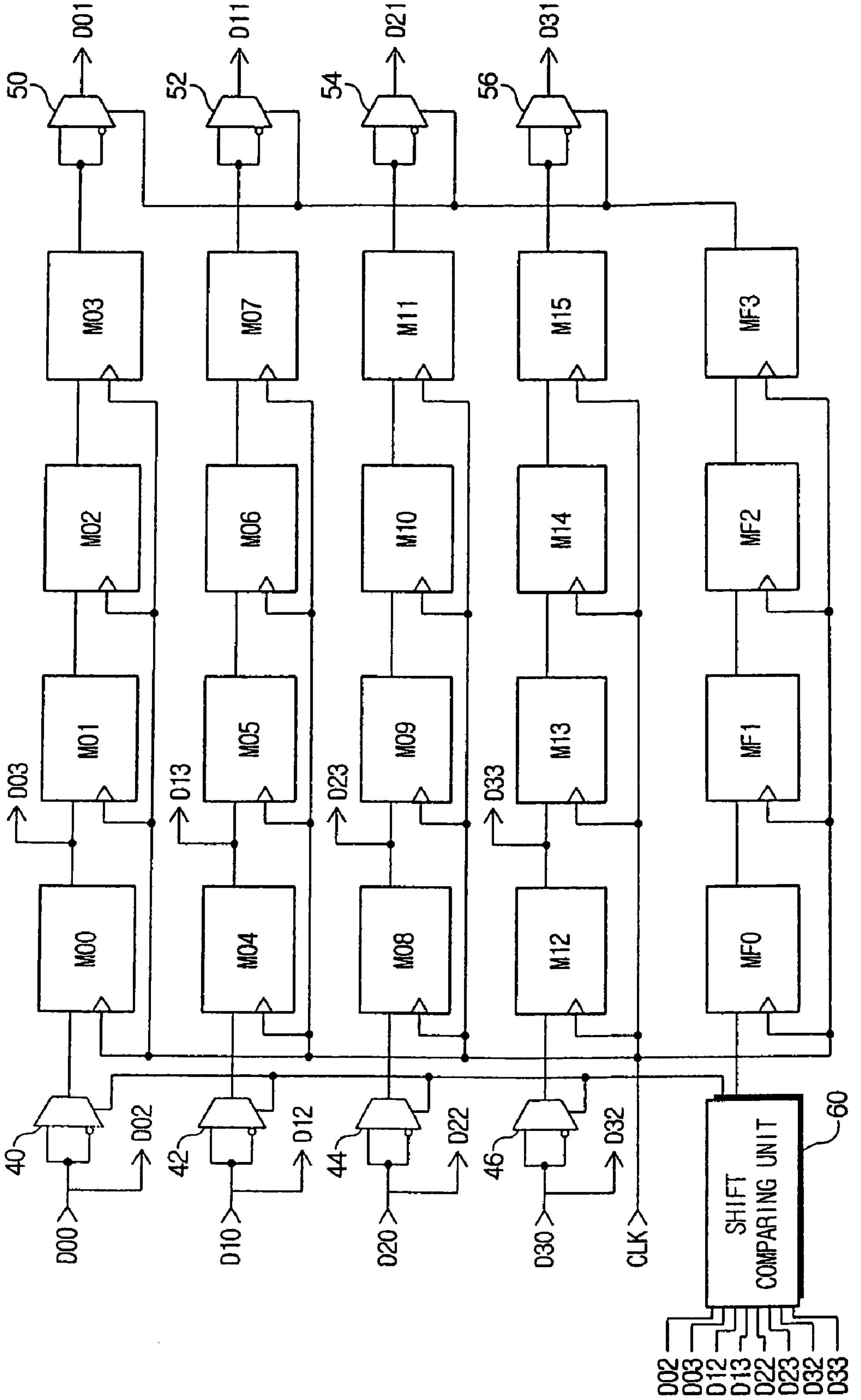
FIG. 4 is a block diagram illustrating a shift register according to another embodiment of the present invention.
Figure 5:
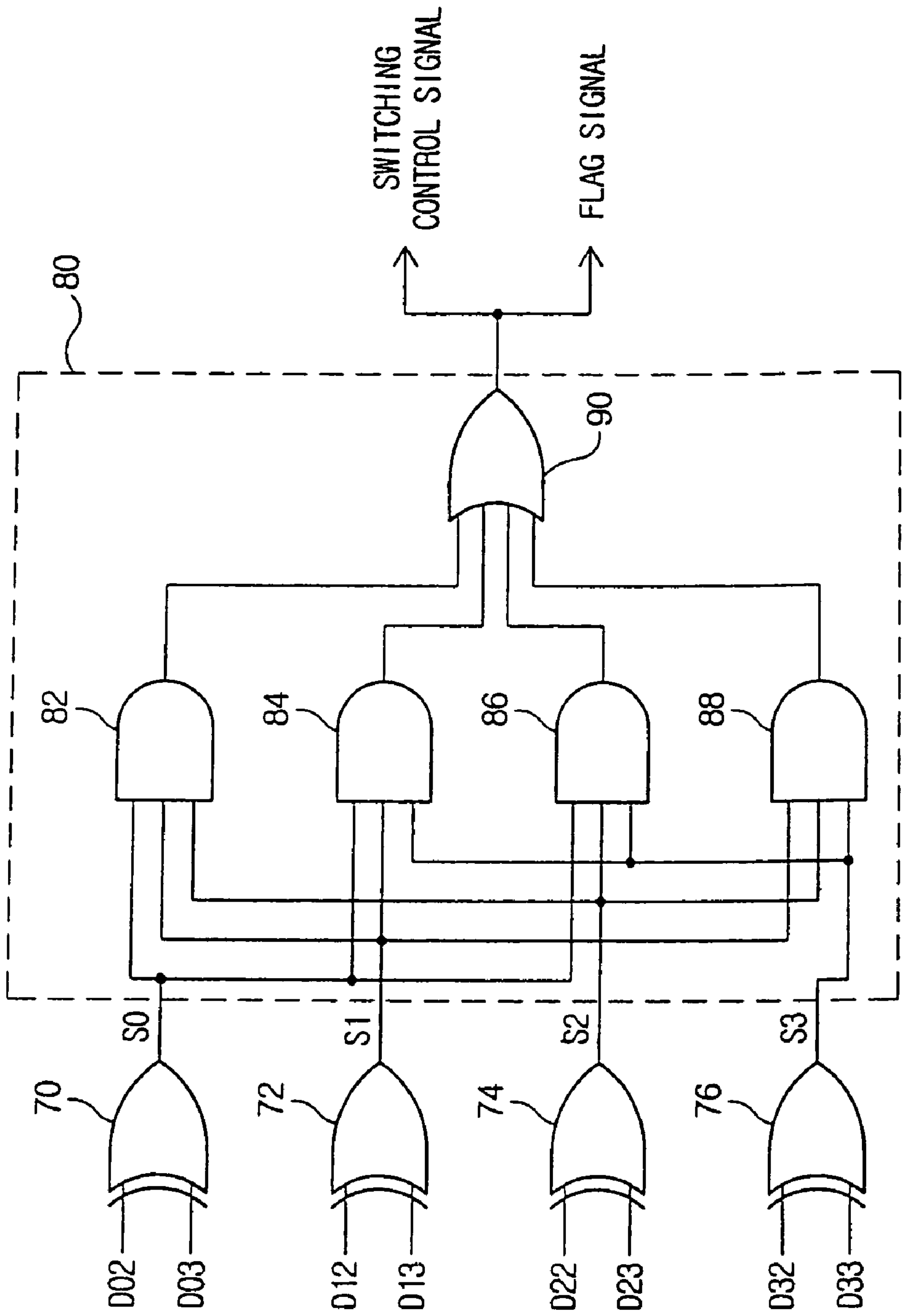
FIG. 5 is a detailed circuit diagram of the shift comparing unit of the shift register shown in FIG. 4.

The shift register of m×n matrix configuration minimizes shifting by checking the state of data being shifted, to thereby decrease instantaneous power consumption and EMI, as shown in FIGS. 4 and 5.

FIG. 4 illustrates 4×4 matrix structured shift register, wherein D flip flops M00, M01-M15 as memory devices constituting the shift register are arranged in matrix.

The first column of the matrix consists of D flip flops M00, M01, M02, M03, the second column of the matrix consists of D flip flops M04, M05, M06, M07, the third column of the matrix consists of D flip flops M08, M09, M10, M11, and fourth column of the matrix consists of D flip flops M12, M13, M14, M15.

D flip flops M00, M04, M08, M12 constituting the first row have input terminals with switching logics 40, 42, 44, 46, respectively. Switching logics 40, 42, 44, 46 classifies input data D00, D10, D20, D30 into positive and negative, and selectively outputs the data to the corresponding D flip flop by a first switching control signal.

D flip flops M03, M07, M11, M15 constituting the fourth row have output terminals with switching logics 50, 52, 54, 56, respectively. Switching logics 50, 52, 54, 56 classifies data output from D flip flops M03, M07, M11, M15 into positive and negative, and selectively outputs data D01, D11, D21, D31 by a second switching control signal.

Data D02, D12, D22, D32 obtained by dividing data D00, D10, D20, D30 and output D03, D13, D23, D33 of D flip flops M00, M04, M08, M12 of the first row are input to the shift comparing unit 60. The shift comparing unit 60 applies, as the first switching control signal, the result of processing the input data using the logic process configured as shown in FIG.

5, to switching logics 40, 42, 44, 46, and at the same time inputting a flag signal to the input terminal of D flip flop MF0.

To shift the flag signal, D flip flops MF0, MF1, MF2, MF3 of the counts same as those of column of matrix, constitute a column. D flip flops MF0, MF1, MF2, MF3 are shift comparing shift registers. The flag signal is shifted passing through D flip flops MF0, MF1, MF2, MF3, and input as the second switching control signal of switching logics 50, 52, 54, 56.

Each of D flip flops M00, M01-M15, MF0, MF1, MF2, MF3 is applied with a clock signal CLK for operation of flip flops.

The shift comparing unit 60 consists of exclusive OR gates 70, 72, 74, 76 and a logical combination unit(80).

In detail, the exclusive OR gate 70 obtains exclusive logical sum S0 of data D02 and D03, the exclusive OR gate 72 obtains exclusive logical sum S1 of data D12 and D13, the exclusive OR gate 74 obtains exclusive logical sum S2 of data D22 and D23, and the exclusive OR gate 76 obtains exclusive logical sum S3 of data D32 and D33.

The logical combination unit 80 consists of four AND gates 82, 84, 86, 88 and an OR gate 90 for logically summing outputs of the four AND gates. The AND gate 82 obtains product of exclusive logical sums S0, S1, S2. The AND gate 84 obtains product of exclusive logical sums S0, S1, S3. The AND gate 86 obtains product of exclusive logical sums S0, S2, S3. And the AND gate 88 obtains product of exclusive logical sums S1, S2, S3.

Outputs of AND gates 82, 84, 86, 88 are logically summed in the OR gate 90, and input to switching logics 40, 42, 44, 46 and D flip flop MF0, as a first switching control signal and a flag signal, respectively.

Under the assumption that data "0000" is stored in D flip flops M00, M04, M08, M12 of the first row, respectively, and data to be input D00, D10, D20, D30 is "1111", D flip flops M00, M04, M08, M12 of the first row shift, when clock signal CLK is input, the stored data "0000" to D flip flops M01, M05, M09, M13 of the second row and store new data "1111". However, in this case, all of D flip flops M00, M04, M08, M12 of the first row shift require current supply for converting from logic "0" to "1". If D flip flops constituting the matrix perform the above-described data conversion in their entirety, a significant amount of instantaneous power supply is needed.

In the first embodiment of the present invention, data D02, D12, D22, D32 which are divided from the data to be input to the first row, and data D03, D13, D23, D33 output from D flip flops constituting the first row are compared in the shift comparing unit 60. This prevents data conversion that may require huge volume of power supply.

In other words, the exclusive OR gate 70 compares input data and output data of D flip flop M00, and outputs logic "0" if they are the same, and logic "1" if two data if they are different. The other exclusive OR gates 72, 74, 76 compare input data and output data of D flip flops M04, M08, M12, and outputs "0" or "1" as a logic result.

TABLE 1

| S0 | S1 | S2 | S3 | AND gate(84) | AND gate(86) | AND gate(88) |
|---|---|---|---|---|---|---|
| 0 | 0 | 0 | 0 | 0 | 0 | 0 |
| 0 | 0 | 0 | 1 | 0 | 0 | 0 |
| 0 | 0 | 1 | 0 | 0 | 0 | 0 |
| 0 | 0 | 1 | 1 | 0 | 0 | 0 |
| 0 | 1 | 0 | 0 | 0 | 0 | 0 |
| 0 | 1 | 0 | 1 | 0 | 0 | 0 |
| 0 | 1 | 1 | 0 | 0 | 0 | 0 |
| 0 | 1 | 1 | 1 | 0 | 0 | 1 |
| 1 | 0 | 0 | 0 | 0 | 0 | 0 |
| 1 | 0 | 0 | 1 | 0 | 0 | 0 |
| 1 | 0 | 1 | 0 | 0 | 0 | 0 |
| 1 | 0 | 1 | 1 | 0 | 1 | 0 |
| 1 | 1 | 0 | 0 | 0 | 0 | 0 |
| 1 | 1 | 0 | 1 | 1 | 0 | 0 |
| 1 | 1 | 1 | 0 | 0 | 0 | 0 |
| 1 | 1 | 1 | 1 | 1 | 1 | 1 |

Each of exclusive OR gates 70, 72, 74, 76 have outputs S0, S1, S2, S3 as shown in Table 1, and AND gates 82, 84, 86, 88 accordingly have outputs as shown in Table 1. In other words, AND gates 82, 84, 86, 88 output logic "1" when input data and output data of D flip flops D00, D04, D08, D12 of the first row are compared and a change is found in the set state. Then, the OR gate 90 outputs a first switching control signal and a flag signal as logic "1".

Switching logics 40, 42, 44, 46 inverts the state of input data and outputs the result to D flip flop M00, M04, M08, M12, when the first switching control signal is fed from the shift comparing unit 60 as logic "1". Then, the flag signal for recognizing conversion of data for corresponding row is input to D flip flop MF0 constituting the shift comparing shift register. The flag signal to be stored in D flip flop MF1 is synchronized with clock CLK and shifted like other data stored in D flip flops D00, D04, D08, D12 of the first row.

When data state change is estimated in three or more D flip flops of each row, the data being input is converted and stored in the corresponding D flip flop, and the corresponding flag is stored. In this manner, data conversion of flip flops can be maintained minimum, while at the same time reducing instantaneous power supply, preventing the occurrence of EMI.

When thus-stored data and flag are shifted, D flip flops M03, M07, M11, M15 of the last row output data, and the flag signal is output from the last D flip flop of the shift comparing shift register.

The flag signal output from D flip flop MF3 is a second switching control signal, and is input to switching logics 50, 52, 54, 56.

Therefore, switching logics 50, 52, 54, 56 invert data output from D flip flops M03, M07, M11, M15 constituting the last row of the shift register and output data D01, D11, D21, D31 when the flag signal, i.e., the second switching control signal, is applied as logic "1".

When data is stored as "0000" to D flip flops M00, M04, M08, M12 of the first row and data D00, D10, D20, D30 are input as "1111", switching logics 40, 42, 44, 46 invert the state of data D00, D10, D20, D30 and input "0000" to D flip flops M00, M04, M08, M12. Here, the flag signal generated together with the first switching control signal applied to switching logics 40, 42, 44, 46, is stored in D flip flop MF0 of the shift comparing shift register.

When such data and flag signal are synchronized with the clock signal, gradually shifted, output from D flip flops M03, M07, M11, M15 of the last row, and input to switching logics 50, 52, 54, 56, data of logic "0000" is inverted into the original state "1111" by the second switching control signal output from D flip flop MF3 of the shift comparing shift register.

The above-described shift register can be employed for controllers, column driver ICs, and scan driver ICs of LCD with configuration shown in FIG. 1. By a method of checking and estimating delayed or input data and shifted data, a phenomenon where a large amount of power is instantaneously supplied to shift registers arranged within controllers, column driver ICs and scan driver ICs, can be prevented while at the same time preventing the occurrence of EMI.

The present invention has an advantage in that shift registers operate as being sequentially delayed for each memory device or data conversion is minimized, thus preventing instantaneous excessive supply of electric power. With the shift register of the present invention adopted to components of LCD, EMI problem can be solved.

What is claimed is:

1. A shift register, comprising:

memory devices formed in a shape of an m-row×n-column matrix and shifting data synchronized with a clock signal;

a first switching unit that selectively inverts n-bit data in accordance with a first switching control signal and inputs the inverted data to a first row memory device of each column of said memory devices;

a second switching unit that selectively inverts n-bit data shifted by said memory devices and output to each column of m-th row in accordance with a second switching control signal and outputs the inverted data;

a shift comparing unit that outputs a flag signal while outputting a first switching control signal to said first switching unit when data state of the first row memory devices changes, by utilizing n-bit data being input to said first switching unit and output data of the first row memory device included in said memory devices; and a shift comparing shift register having m-numbers of memory devices arranged in line and that shifts the flag signal output from said shift comparing unit to be synchronized with shift of said memory devices and outputs a second control signal to said second switching unit.

2. A shift register according to claim 1, wherein said first switching unit and said second switching unit have switching logic corresponding one-to-one to each row of said memory devices, and the switching logic selectively outputs input data and inverted data thereof in accordance with state of the first switching control signal and the second switching control signal.

3. A shift register according to claim 1, wherein said shift comparing unit comprises:

exclusive OR gates for performing exclusive OR sum of n-bit data to be input to said first switching unit and output data of the first row memory device to said memory device, and outputting the result;

a logical combination unit for logically combining outputs of said exclusive OR gates, and outputting a logic high level as said first switching control signal and a flag signal to be applied to said shift comparing shift register, when a pair of output data and input data of first row memory device is higher than a predetermined number.

4. A shift register according to claim 3, wherein the number determined by said logical combination unit is larger than half of the number of the first row memory device.

5. A shift register in a driver circuit of liquid crystal display for driving a liquid crystal panel by generating data, gradation voltage, gate voltage, and column/scan control signals in accordance with an image signal input from an image source, comprising:

memory devices formed in a shape of an m-row×n-column matrix and shifting data synchronized with a clock signal;

a first switching unit that selectively inverts n-bit data in accordance with a first switching control signal and inputs the inverted data to a first row memory device of each column of said memory devices;

a second switching unit that selectively inverts n-bit data shifted by said memory devices and output to each column of m-th row in accordance with a second switching control signal and outputs the inverted data;

a shift comparing unit that outputs a flag signal while outputting a first switching control signal to said first switching unit when data state of the first row memory devices changes, by utilizing n-bit data being input to said first switching unit and output data of the first row memory device included in said memory device; and a shift comparing shift register having m-numbers of memory devices arranged in line and that shifts the flag signal output from said shift comparing unit to be synchronized with shift of said memory devices and outputs a second control signal to said second switching unit.

6. A shift register according to claim 5, wherein said first switching unit and said second switching unit have switching logic corresponding one-to-one to each row of said memory devices, and the switching logic selectively outputs input data and inverted data thereof in accordance with state of the first switching control signal and the second switching control signal.

7. A shift register according to claim 5, wherein said shift comparing unit comprises:

exclusive OR gates for performing exclusive OR sum of n-bit data to be input to said first switching unit and output data of the first row memory device to said memory device, and outputting the result;

a logical combination unit for logically combining outputs of said exclusive OR gates, and outputting a logic high level as said first switching control signal and a flag signal to be applied to said shift comparing shift register, when a pair of output data and input data of first row contained in said memory devices is higher than a predetermined number.

8. A shift register according to claim 7, wherein the number determined by said logical combination unit is larger than half of the number of the first row memory device.

9. A shift register according to claim 5, wherein the shift register is used in a controller.

10. A shift register according to claim 5, wherein the shift register is used in column driver ICs.

11. A shift register according to claim 5, wherein the shift register is used in scan driver ICs.

* * * * *